United States Patent [19]

Smith

[11] Patent Number: 4,847,477
[45] Date of Patent: Jul. 11, 1989

[54] REDUCING PHASE FLUCTUATIONS IN A COHERENT RADIATION BEAM USING FEEDFORWARD CONTROL

[75] Inventor: David W. Smith, Woodbridge, England

[73] Assignee: British Telecommunications Public Limited Company, United Kingdom

[21] Appl. No.: 107,590

[22] PCT Filed: Jan. 27, 1987

[86] PCT No.: PCT/GB87/00050
§ 371 Date: Nov. 12, 1987
§ 102(e) Date: Nov. 12, 1987

[87] PCT Pub. No.: WO87/04529
PCT Pub. Date: Jul. 30, 1987

[30] Foreign Application Priority Data

Jan. 28, 1986 [GB] United Kingdom ............... 8602017

[51] Int. Cl.$^4$ ............................................. G01J 1/20
[52] U.S. Cl. ...................................... 250/201; 372/29
[58] Field of Search ............... 250/201, 205; 455/615, 455/609; 329/145; 372/29, 31, 32

[56] References Cited

U.S. PATENT DOCUMENTS 3,699,463 10/1972 Stone .
4,221,960 9/1980 Maeda et al. ...................... 250/205
4,287,606 9/1981 Lutes, Jr. et al. ................... 455/615

FOREIGN PATENT DOCUMENTS 8002467 11/1980 Australia .
82/00736 3/1982 European Pat. Off. .
2850374 6/1978 Fed. Rep. of Germany .
2022856 12/1979 United Kingdom .

OTHER PUBLICATIONS

Patents Abstracts of Japan, vol. 7, No. 119 (E-177) [1264], 24th May 1983; & JPA-58-39-084 (Nippon Denki K.K.), 07-03-1983.
English Translation of Japanese Patent Application No. 58-39084-(2 sheets).
Patent Abstracts of Japan, vol. 6, No. 38 (E-144) [1116], 26th Nov. 1982; & JP-A-57 139 979 (Nippon Denki K.K.), 30-08-1982.
Demodulation of Optical DPSK Using In-Phase and Quadrature Detection by T. G. Hodgkinson et al., 31 Jul. 1985-pp. 867-868.

Primary Examiner—David C. Nelms
Assistant Examiner—Khaled Shami
Attorney, Agent, or Firm—Nixon & Vanderhye

[57] ABSTRACT

A method and apparatus for reducing fluctuations such as phase noise in a characteristic of a coherent beam of radiation. The apparatus includes an interferometer for sensing the fluctuation at the first position to generate an interference beam. The interference beam is incident on a radiation detector such as a photodiode which generates an electrical output signal responsive to the intensity of the incident beam. This signal is amplified by an amplifier and fed to a phase modulator. Another portion of the original laser beam is also fed to the phase modulator. The arrangement is such that the phase modulations applied to the beam by the phase modulator under the control of the signal from the detector reduce or cancel the phase noise in the original beam.

11 Claims, 2 Drawing Sheets

REDUCING PHASE FLUCTUATIONS IN A COHERENT RADIATION BEAM USING FEEDFORWARD CONTROL

The invention relates to methods and apparatus for reducing a fluctuation in a characteristic of a beam of radiation.

The invention is concerned, for example, with the reduction of noise in a characteristic such as the phase, frequency, or amplitude of a beam of radiation.

In the field of optical communication networks it has been determined that for high performance PSK and DPSK schemes ratios of line width to bit rate of between 0.05% to 0.3% are required. For the lower performance ASK and FSK schemes, featuring non-synchronous detection, laser line width/bit rate ratios of between 10% and 30% may be acceptable although it should be noted that practical considerations may dictate narrower line widths if good performance is to be achieved.

At moderate bit rates it is expected that DFB lasers will be suitable for FSK and ASK providing sufficient receiver bandwidth is available to operate at a suitably high IF frequency to enable simple envelope detection schemes to be used. Alternatively the more complex I & Q strategy may be necessary, as described in "Demodulation of optical DPSK using in-phase and quadrature detection" by T. G. Hodgekinson, R. A. Harman and D. W. Smith, Elec. Lett. Vol 21 (1985) pp 867–868. However, using currently available DFB lasers, say 15 MHz linewidth, it is unlikely that they could be used in DPSK/PSK schemes at bit rates less than 5 to 15 GBit/s unless line narrowing techniques are employed.

So far only two techniques have been truly successful, injection locking using a gas laser and the application of external cavities. Both techniques, however, are not ideal for widespread low cost high volume application.

Wideband opto-electronic feedback in the form of frequency control systems or phase locked loops has been proposed to reduce laser phase noise. Both suffer from the serious practical difficulty, common to all wideband feedback control system design, of closed loop stability. In practice, it is necessary to take great care in reducing loop time constants and pure time delay around the loop. Furthermore, loop parameters will be a function of several device features, i.e. laser output power, laser FM characteristics, signal polarisation etc. and it is expected that loop stability could be unpredictable and re-optimisation will often be necessary.

In accordance with one aspect of the present invention, a method of reducing a fluctuation in a characteristic of a coherent beam of radiation comprises sensing the fluctuation at a first postion to generate a compensating signal related to the sensed fluctuation; and modifying the characteristic of the beam at a second position downstream of the first position under control of the compensating signal to reduce the random fluctuation.

In accordance with a second aspect of the present invention, apparatus for reducing a fluctuation in a characteristic of a coherent beam of radiation comprises sensing means for sensing the fluctuation at a first position; signal generating means responsive to the sensing means to generate a compensating signal related to the sensed fluctuation; and radiation beam modifying means for modifying the characteristic of the beam at a second position downstream of the first position under control of the compensating signal to reduce the random fluctuation.

The invention is based on a feed foward technique which should be contrasted with the feedback methods described above. The feed forward technique should not suffer from problems of instability.

The invention is particularly applicable to the reduction or cancellation of random fluctuations such as phase noise and this could enable presently available single mode semiconductor lasers, such as DFB lasers, to be used in the most demanding PSK transmission systems, even at moderate (<1 Gbits/s) data rates.

The invention could also be used to remove a non-random fluctuation such as a low frequency identification signal.

The invention is particularly applicable to beams of coherent optical radiation although the principles may be applied to radiation outside the optical range. In this specification, by optical, we refer to that part of the electro-magnetic spectrum which is generally known as the visible region together with those parts of the infrared and ultra-violet regions at each end of the visible region which are capable of being transmitted by dielectric optical waveguides such as optical fibres.

The invention is thus particularly useful in optical communication systems.

Preferably, the compensating signal is at relatively low power compared with the beam of radiation. This can be achieved if the first position is relatively close to the source of the beam of radiation, such as a laser. With this arrangement, any noise in the compensating signal itself will be insignificant compared with the modulation due to the fluctuations in the characteristic of the radiation beam.

For example, the sensing step may comprise sampling the beam of radiation, causing successive parts of the sampled beam of radiation to interfere to generate an interference beam, monitoring fluctuations in the intensity of the interference beam, and generating a compensating signal which varies in accordance with the intensity changes in the interference beam.

Typically, in this case where the first position is close to the source of the radiation beam, the sampled beam may have a power of 1mW with any amplitude noise in the compensating signal being at a power level of at least 40 dB below.

Preferably, the sensing means comprises sampling means for sampling the beam of radiation at the first position, and an interferometer to which the sampled beam of radiation is guided to generate an interference beam; and wherein the signal generating means comprises a radiation detector to which the interference beam from the interferometer is fed, the radiation detector generating an electrical signal whose amplitude varies in accordance with the intensity of the interference signal sensed by the radiation detector.

The interferometer may comprise a Fabry-Perot interferometer or be fabricated as an integrated optic device such as a Mach-Zender interferometer. This latter arrangement is particularly suitable where the beam of radiation is an optical beam.

Some examples of methods and apparatus according to the invention will now be described with reference to the accompanying drawings, in which.

Figure 1:
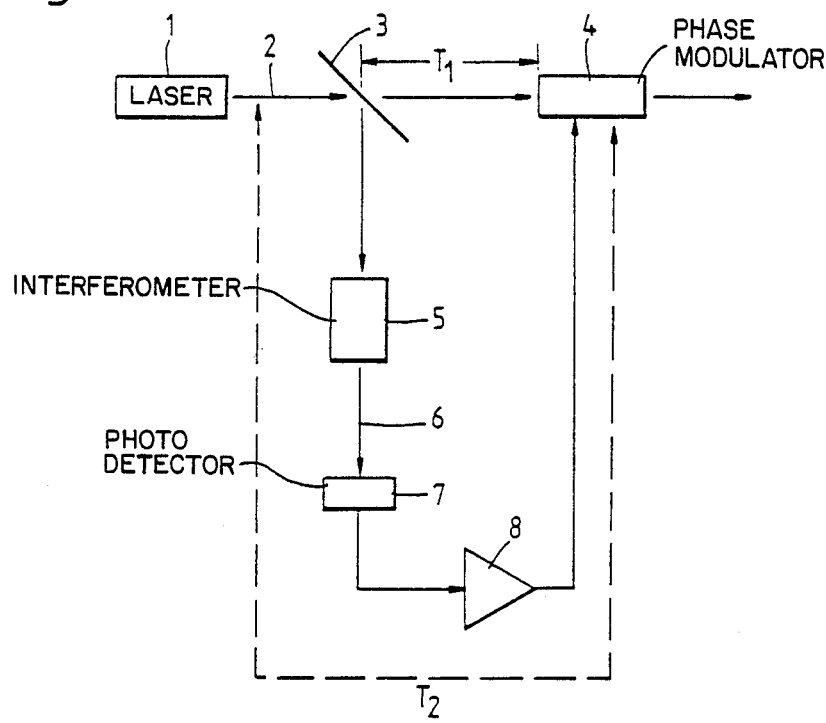
FIGS. 1 and 2 are block diagrams of first and second examples respectively.

All the examples shown in the drawings are for reducing random phase noise in a beam of coherent optical radiation generated by a laser. The phase noise is the fluctuation in phase in a beam of radiation caused by spontaneous emission in the source. These phase fluctuations define the line width of the beam and the purpose of the invention is to reduce this line width.

In the example shown in FIG. 1, a laser 1 generates a beam of optical radiation 2 which impinges on a semi-silvered mirror 3. A proportion of the incident beam passes through the mirror 3 and is guided to a phase modulator 4. The remaining portion of the beam is reflected towards an interferometer 5.

The interferometer 5 causes successive portions of the incident beam to interefere. If there was no phase noise then the type of interference ie. constructive or destructive would remain constant and an interference beam 6 would be generated having a constant amplitude. However, if the incident beam has a finite line width then this will cause the interference beam 6 to have a fluctuating amplitude which fluctuates in a corresponding manner to the fluctuations in phase. The intereference beam 6 is incident on a photodetector 7 such as a photodiode which generates an electrical signal whose amplitude is proportional to the intensity of the incident beam. This electrical signal is amplified by an amplifier 8 and then fed as a compensating signal to the phase modulator 4. The compensating signal controls the phase modulator 4 to reduce or cancel the phase noise in the beam transmitted directly to the phase modulator.

Effectively, the phase noise of the laser 1 is measured using the interferometer 5 and the inverse of the resulting electronic signal is used to modulate the phase of the light wave before onward transmission. Clearly, for complete phase noise cancellation it should be arranged that the overall transfer characteristic of the error path is $-1$. Also, it is necessary to ensure the time delays $T_1$, $T_2$ are identical for complete cancellation. However, any mismatch in forward path gain and delay results only in a reduction in the degree of phase noise cancellation. It does not produce instability.

Figure 2:
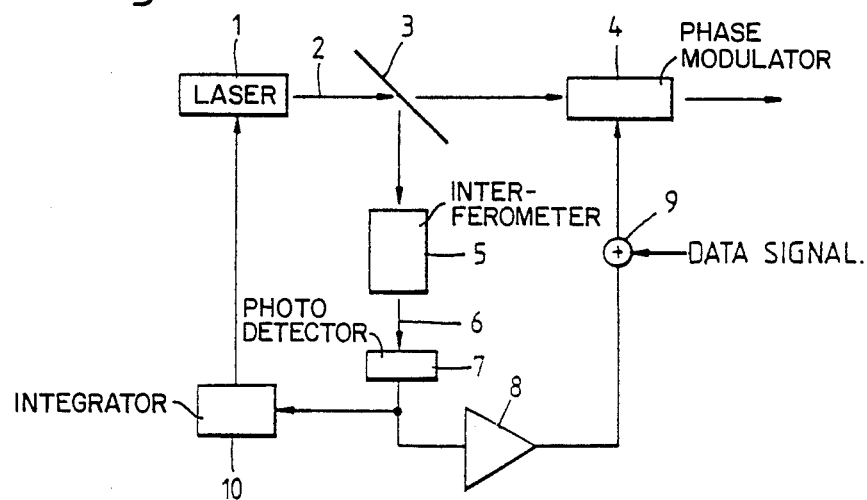

The example shown in FIG. 2 is similar to that shown in FIG. 1 and the components which are the same in both figures have been indicated by the same reference numerals.

Where the apparatus is to be used in an optical transmission system, any conventional coding scheme such as ASK, FSK, or PSK could be used to modulate the beam once the phase noise has been reduced. However, there is some advantage in using PSK modulation since, as shown in FIG. 2, the same phase modulator 4 can be used for phase noise cancellation and to apply the signal modulation. In this case, an electrical control signal carrying the information is fed to a summing circuit 9 for summation with the compensating signal from the amplifier 8. The combined signal is then applied to the phase modulator 4.

In addition, the interferometer 5 used to measure the phase fluctuations can also be used to measure the mean laser frequency. In this case, the output signal from the photodiode 7 is also applied to an integrator 10 whose output is fed back to the laser 1 to maintain the average frequency of the laser output beam substantially constant.

Modifications of the examples shown in FIGS. 1 and 2 could include the use of integrated optics to realise the interferometers which could be integrated with the phase modulator.

Figure 3:
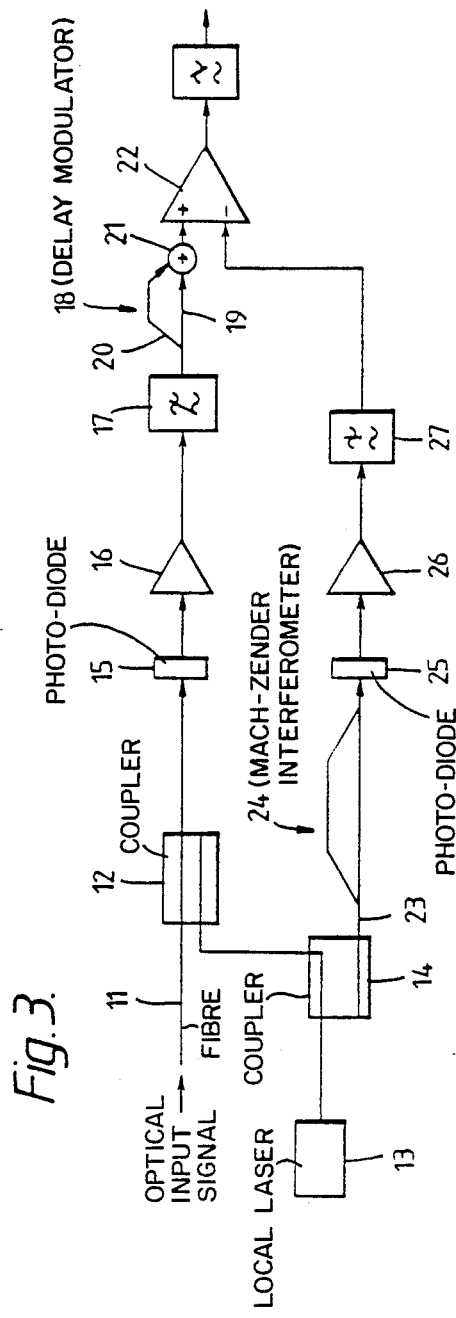
FIG. 3 is a block diagram of a differential PSK receiver incorporating a third example of the invention; and, FIG. 4 is a block diagram of a fourth example.

The invention can be used in a receiver in an optical communication network, particularly where the receiver is used to receive a signal modulated using the DPSK coding scheme. Such an arrangement is shown in FIG. 3. The incoming modulated signal is fed along an optical fibre 11 to an optical coupler 12. A local laser 13 generates an optical beam which is fed to an optical coupler 14 so that a portion of the beam from the laser 13 is fed to the coupler 12 for combining with the incoming modulated signal. The output beam from the coupler 12 is fed along an optical fibre to a photodiode 15 which generates an electrical output corresponding to the intensity of the incident beam. This electrical output signal is amplified in an amplifier 16 and fed via filter 17 to a delay demodulator 18. At the demodulator 18 the incoming signal is split along two paths 19, 20, the path 20 imparting a delay corresponding to one bit before the two paths recombine at a summing circuit 21. The output from the circuit 21 is fed to the non-inverting input of the summing amplifier 22.

The beam from a laser 13 is also coupled by the coupler 14 into an optical fibre 23. The optical fibre 23 is coupled with a Mach-Zener interferometer 24 which has a time delay of the same amount as the time delay imparted by the delay modulator 18. The resultant inteference signal is fed along an optical fibre to a photodiode 25 which provides an electrical output corresponding to the intensity of the incident beam. The electrical signal is amplified by an amplifier 26 and filtered by a filter 27 and then fed to the inverting input of the summing amplifier 22. In the summing amplifier 22, the electrical signal from the photodiode 25 is subtracted from the output of the delay demodulator 18. The delay demodulator 18 also converts the laser phase noise of the beam from the laser 13 into an amplitude fluctuation and thus the subtraction in the amplifier 22 will cancel the effect of the phase noise. Similar techniques can be used in FSK and analogue FM systems featuring delay demodulators.

Figure 4:
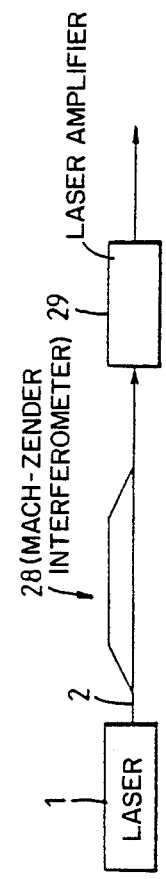

A further development is shown in FIG. 4 in which the electronic portion of the feed forward path has been removed by using non-linear refractive index effects. In this case, the beam 2 from the laser 1 is fed to a Mach-Zender interferometer 28 which converts the phase noise into an amplitude fluctuation in the beam which is fed along an optical fibre to a non-linear device such as a laser amplifier 29. The amplifier 29 converts the amplitude noise into phase noise to cancel the original phase noise.

It should be appreciated that the examples of FIGS. 1, 2 and 4 illustrate optical cancellation of phase noise while in FIG. 3 electrical cancellation occurs.

I claim:

1. A method of reducing random fluctuations in the phase of a coherent beam of radiation, the method comprising:

sensing a fluctuation in phase of a coherent beam of radiation at a first position and generating a compensating signal related to the sensed fluctuation; and modifying the phase of the beam at a second position downstream of the first position under control of the compensating signal to reduce random fluctuations.

2. A method according to claim 1, wherein the compensating signal is at a relatively low power compared with the beam of radiation.

3. A method according to claim 1, wherein the compensating signal comprises an electrical signal.

4. A method according to claim 1, wherein the sensing step comprises sampling the beam of radiation, causing successive parts of the sampled beam of radiation to interfere to generate an interference beam, monitoring fluctuations in the intensity of the interference beam, and generating a compensating signal which varies in accordance with the intensity changes in the intereference beam.

5. A method according to claim 1, wherein the time for the beam to pass from the first position to the second position is substantially the same as the time for the compensating signal.

6. A method of transmitting information by modulating the phase of a coherent beam of radiation in accordance with a modulation signal, the method including;
reducing a random fluctuation in the phase of the beam of radiation in accordance with a method according to claim 1, whereby the phase of the beam of radiation is modified by both the compensating signal and the modulation signal at the second position.

7. A method according to claim 6, wherein the compensating signal is arithmetically summed with the modulation signal to generate a resultant control signal which is used to modify the phase of the beam at the second position.

8. Apparatus for reducing random fluctuations in the phase of a coherent beam of radiation, the apparatus comprising:
sensing means for sending a fluctuation in phase of a coherent beam of radiation at a first position;
signal generating means responsive to the sensing means to generate a compensating signal related to the sensed fluctuation; and
radiation beam modifying means for modifying the phase of the beam at a second position downstream of the first position under control of the compensating signal to reduce the random fluctuation.

9. Apparatus according to claim 8, wherein the sensing means comprises sampling means for sampling the beam of radiation at the first position, and an interferometer to which the sampled beam of radiation is guided to generate an interference beam; and wherein the signal generating means comprises a radiation detector to which the inteference beam from the interferometer is fed, the radiation detector generating an electrical signal whose amplitude varies in accordance with the intensity of the interference signal sensed by the radiation detector.

10. Apparatus according to claim 8, wherein the modifying means comprises a medium having a non-linear transmission characteristic for the beam of radiation, and wherein the beam of radiation itself is modified by the sensing means and the signal generating means such that a component of the beam constitutes the compensating signal which is fed to the modifying means.

11. A receiving assembly for demodulating a differential phase modulated input signal, the assembly comprising a source of radiation; coupling means for coupling radiation from the source with the incoming signal; conversion means for converting the coupled signals into an equivalent modulated electrical signal; a delay demodulator to which the electrical signal is fed; apparatus according to claim 9 to which a portion of the beam of radiation from the source is fed, the interferometer having substantially the same time delay as the delay demodulator; and combining means for combining the electrical signals from the delay demodulator and the interferometer to reduce the effects of phase noise in the beam of radiation from the source.

* * * * *